Figure 9:
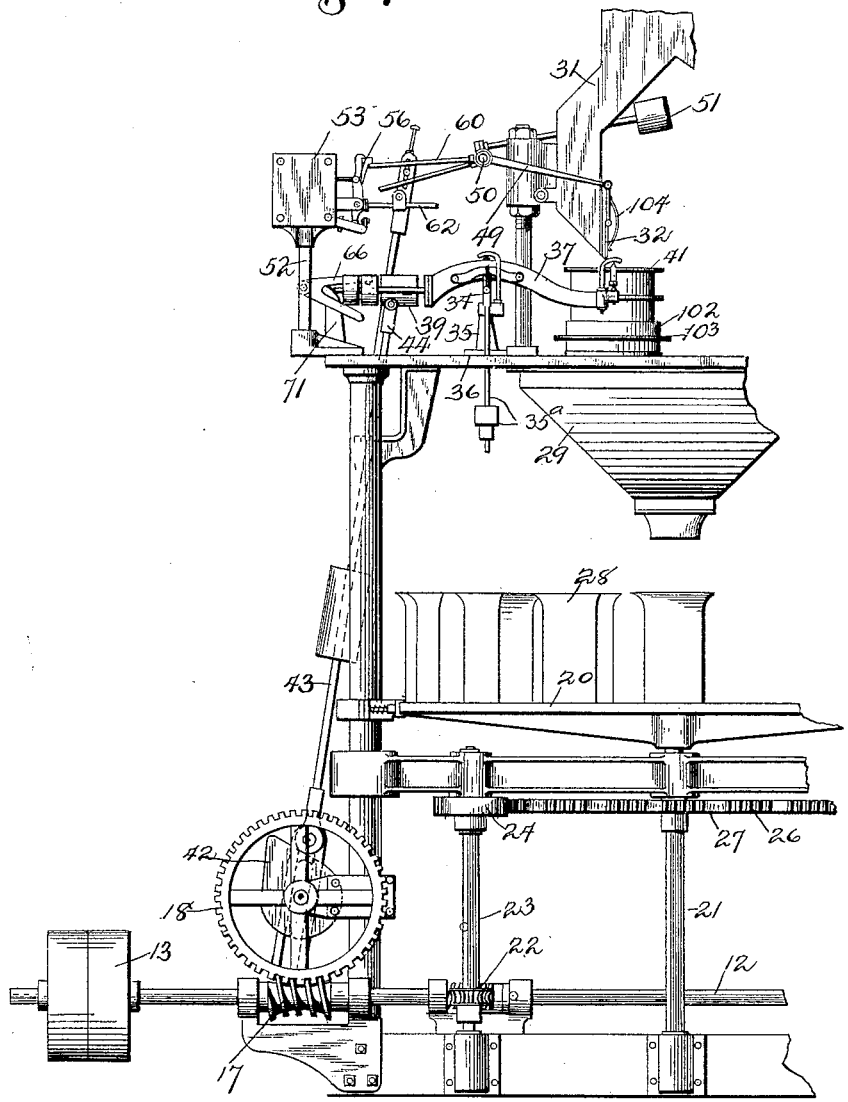

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 1.
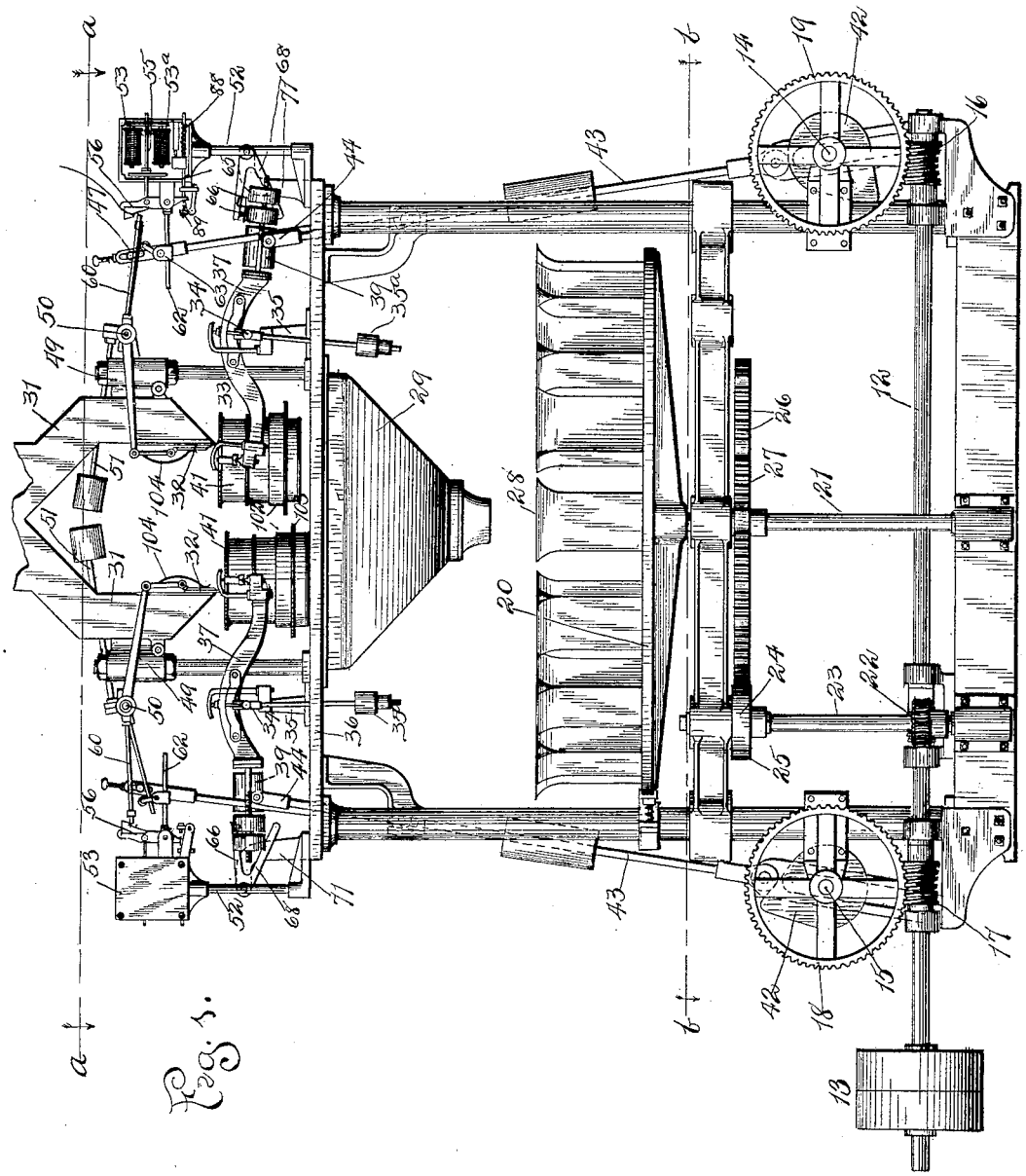

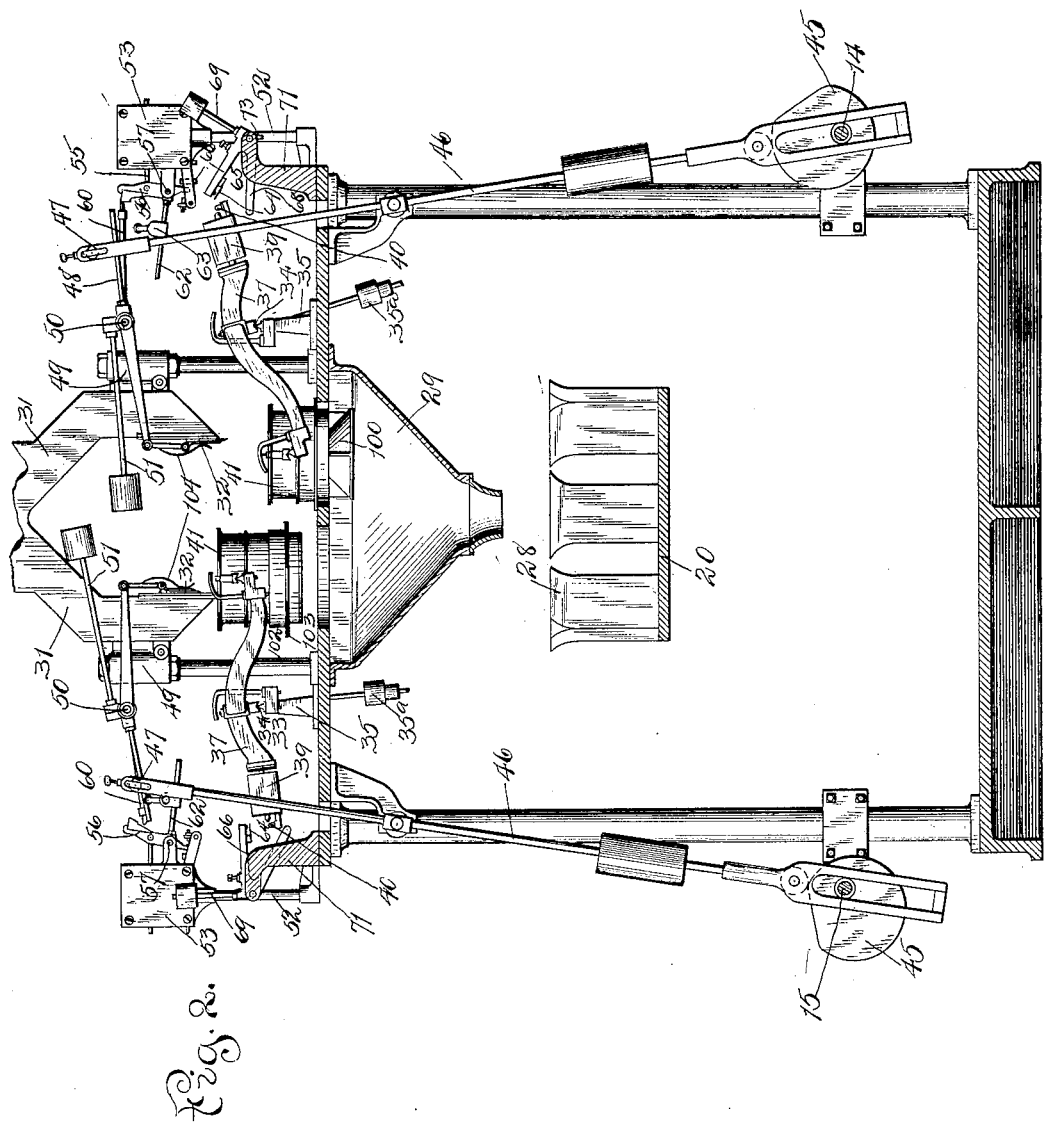

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 3.
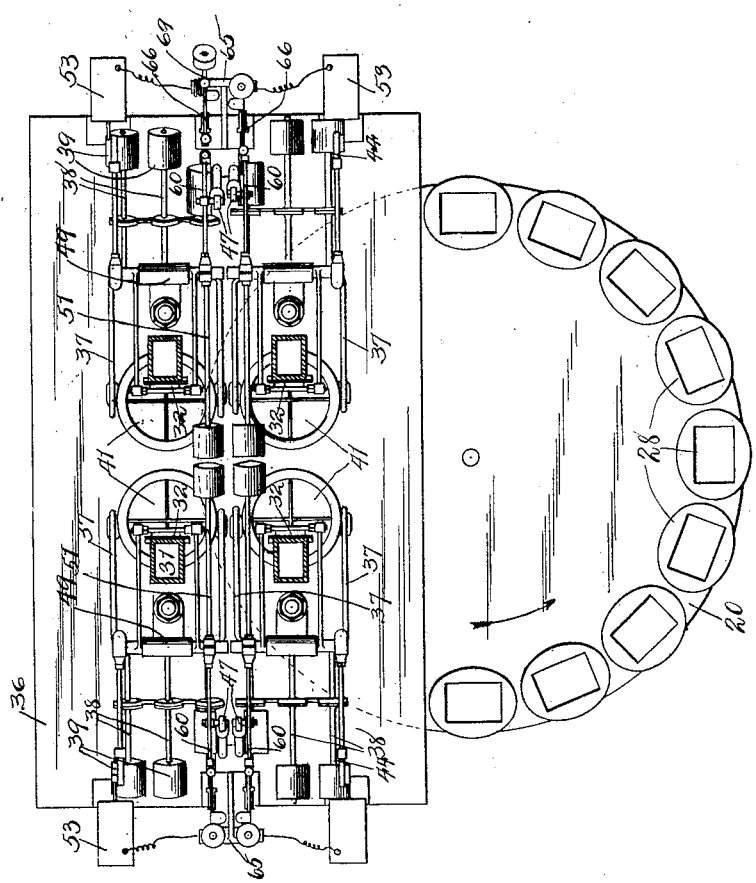

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 4.
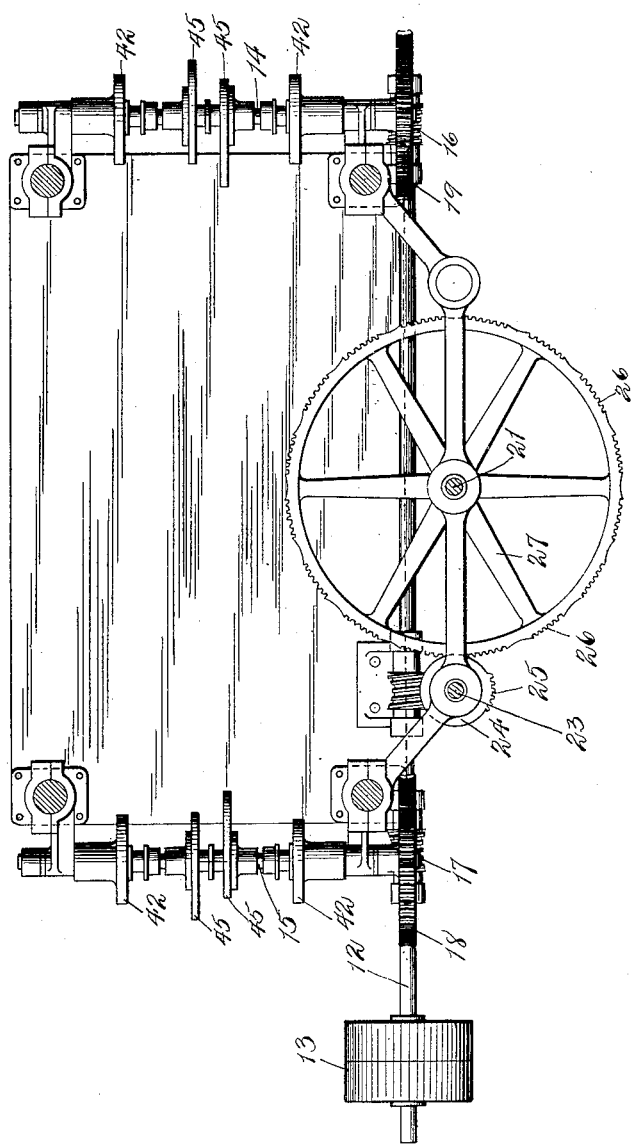

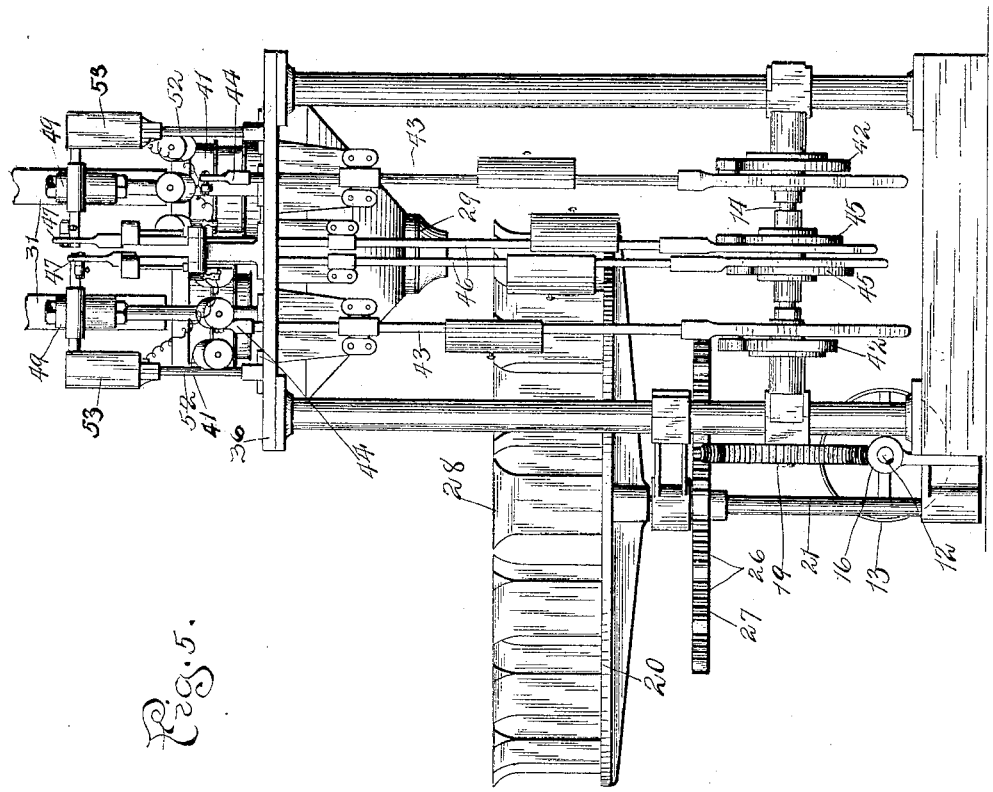

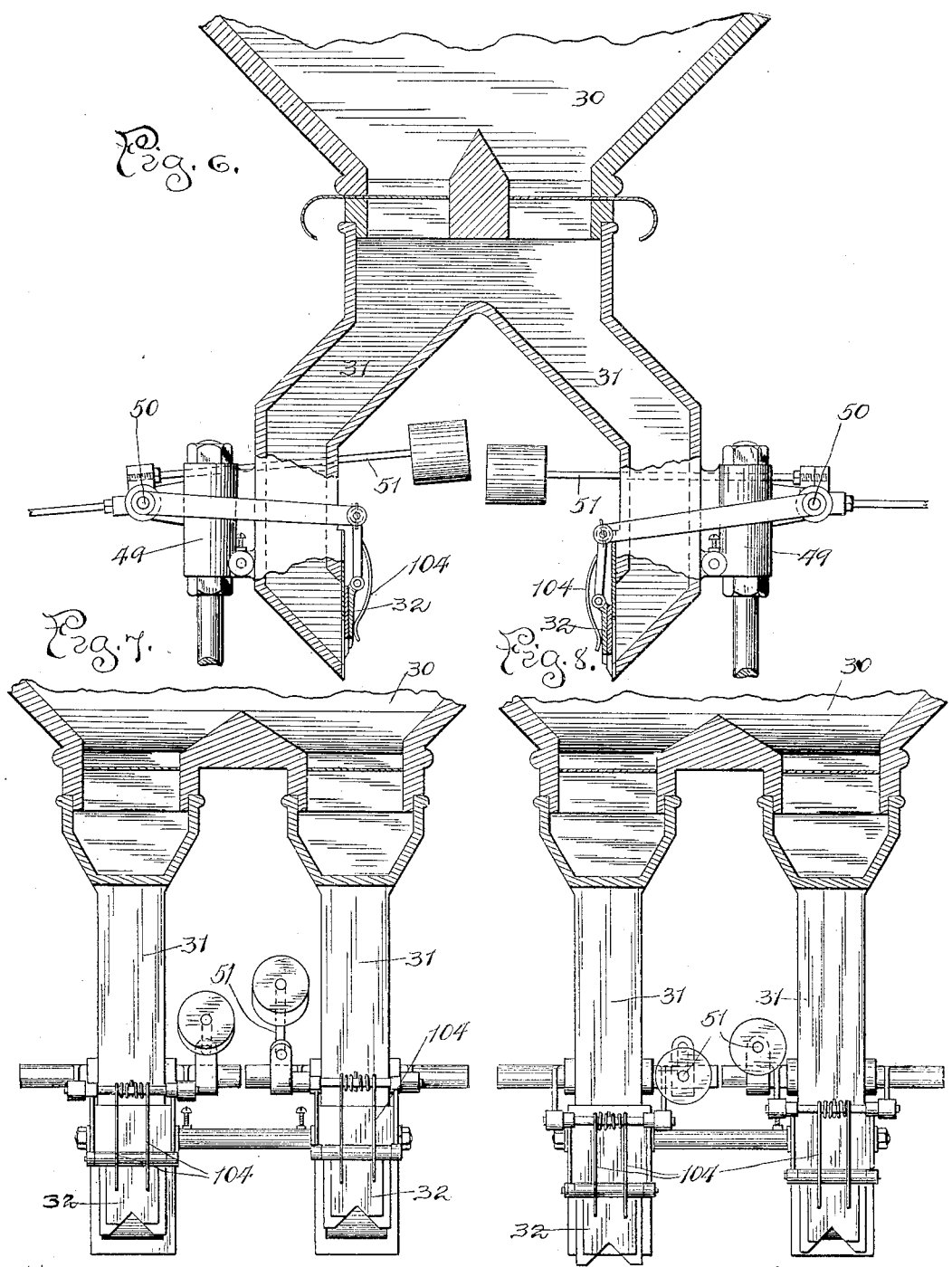

No. 640,625. Patented Jan. 2, 1900.
W. F. BRAUN.
AUTOMATIC WEIGHING MACHINE.
(Application filed Jan. 12, 1899.)

(No Model.) 12 Sheets—Sheet 7.

Witnesses:
J B Weir
L M Buckley

Inventor
William F. Braun
By Chas. C. Buckley, Atty.

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 8.
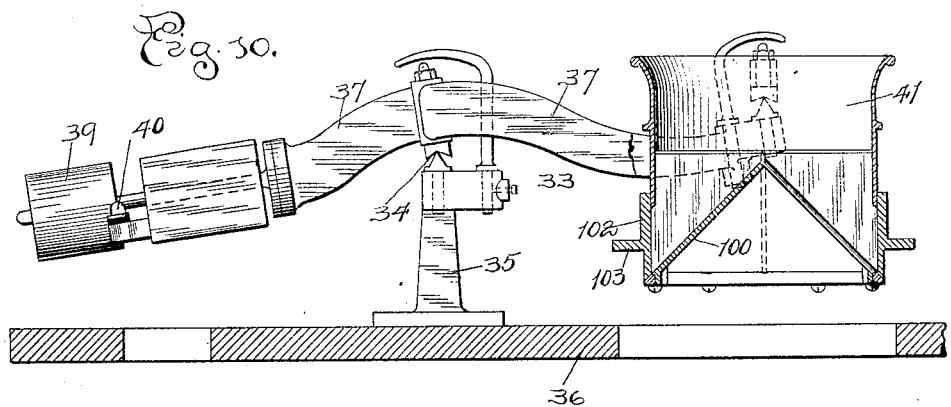
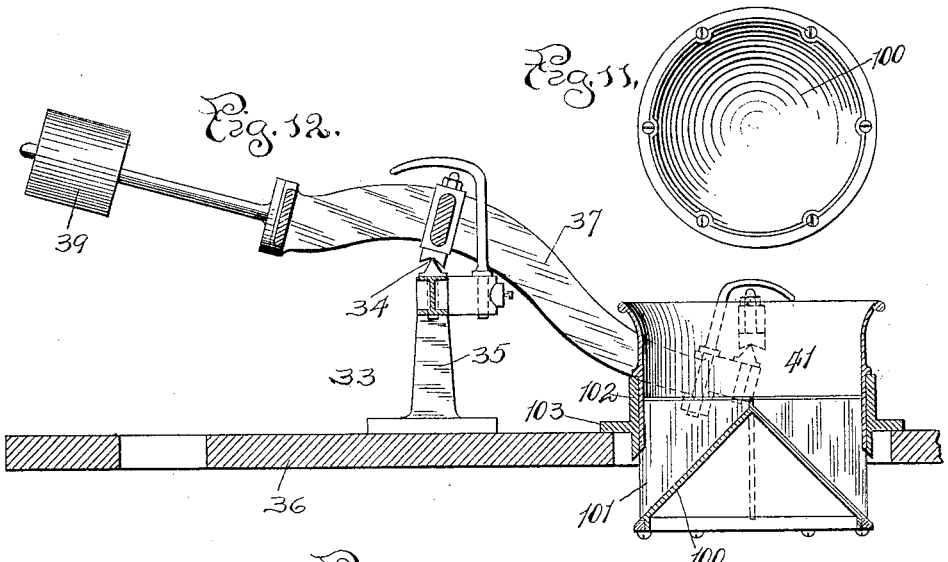
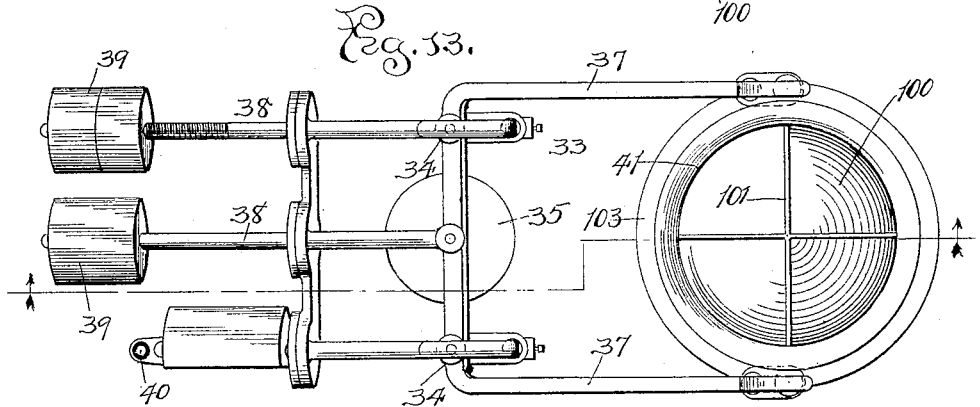
Witnesses:
J B Keir
L M Bulkley
Inventor
William F. Braun,
By Chas. C. Bulkley,
Atty.

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 9.
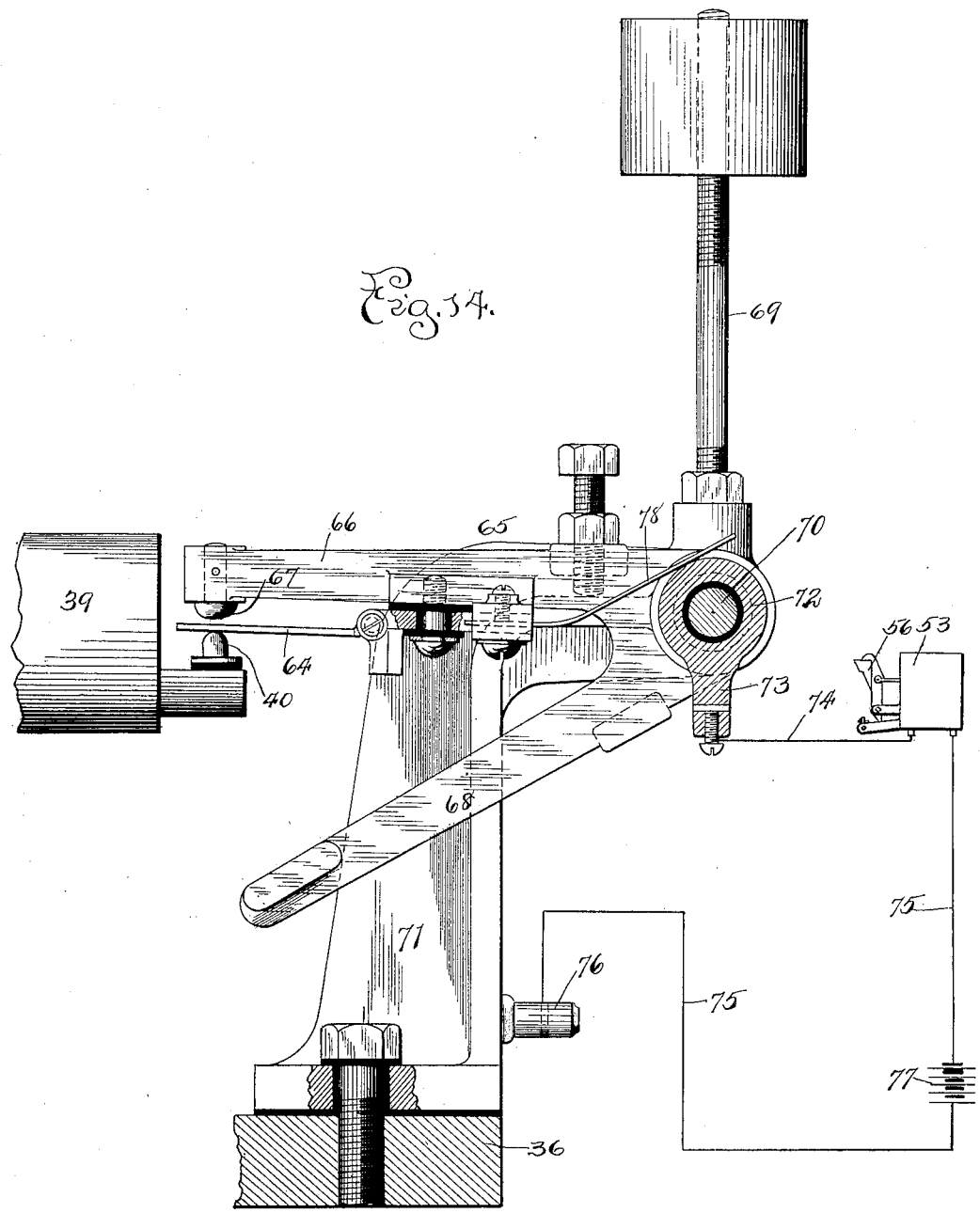

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 10.
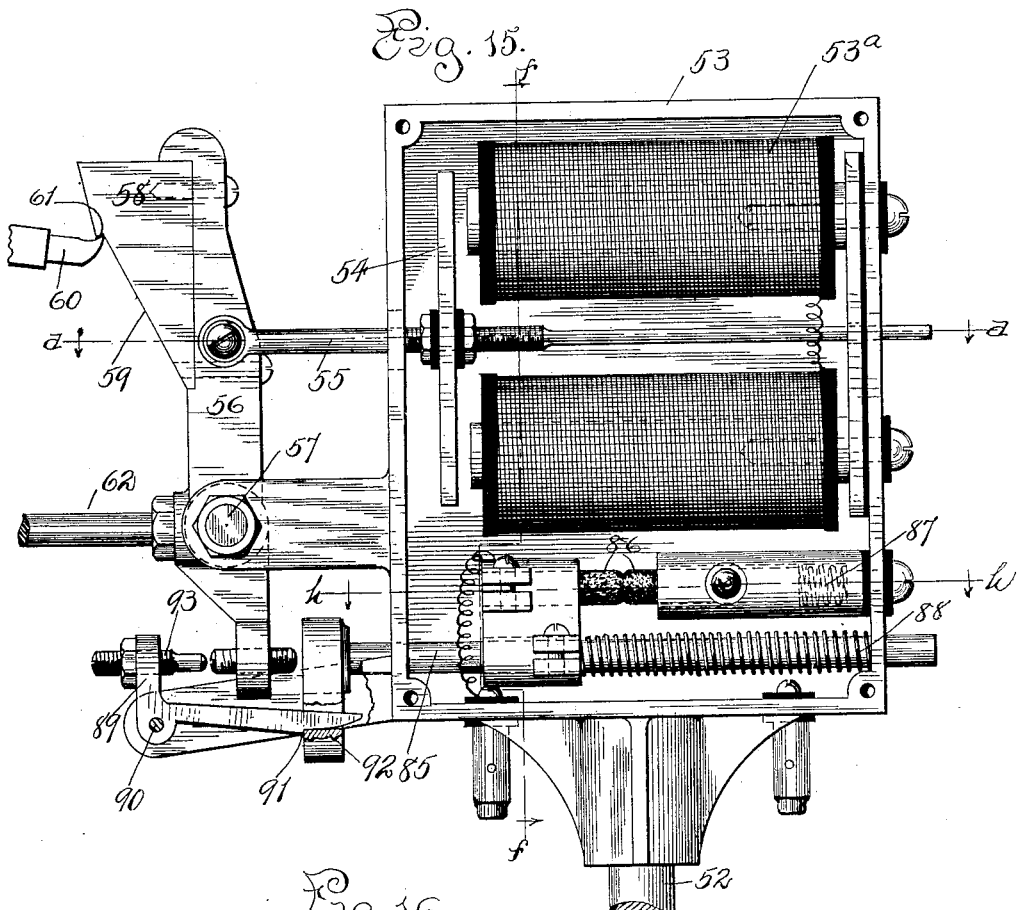
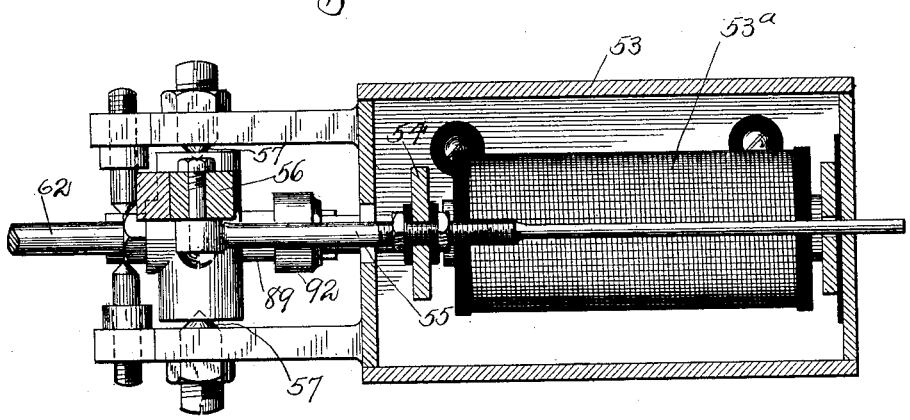
Witnesses:
J. B. Keir
L. M. Bulkley
Inventor,
William F. Braun,
By Chas. C. Bulkley
his Atty.

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 11.
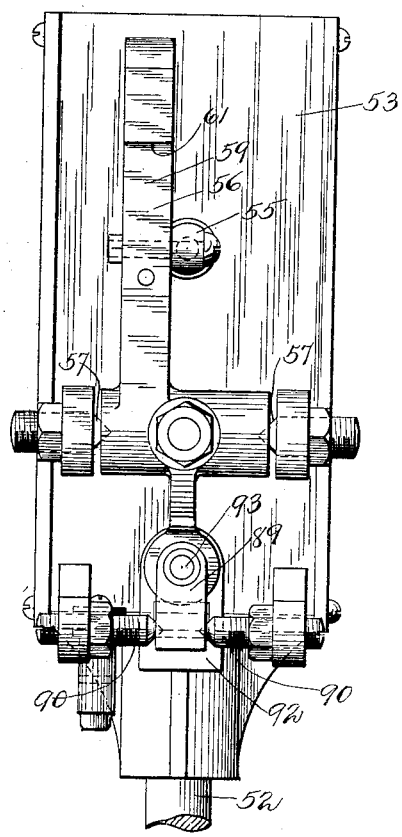
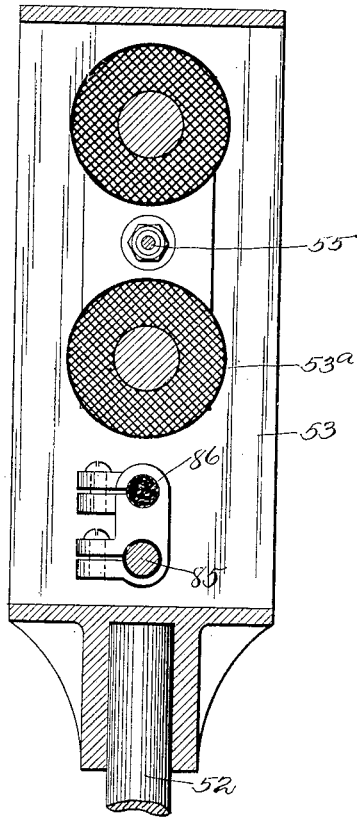
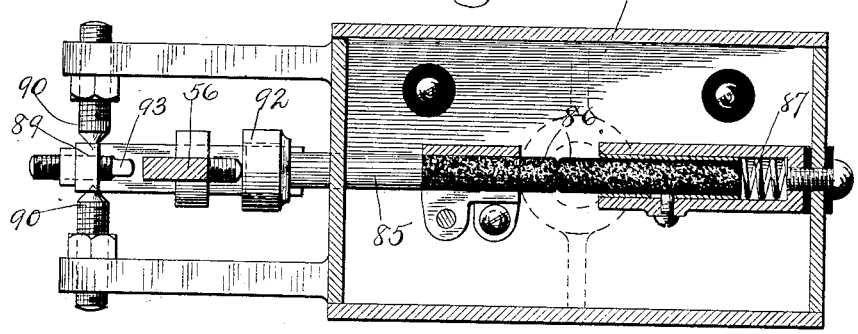

No. 640,625. Patented Jan. 2, 1900.
W. F. BRAUN.
AUTOMATIC WEIGHING MACHINE.
(Application filed Jan. 12, 1899.)
(No Model.) 12 Sheets—Sheet 12.
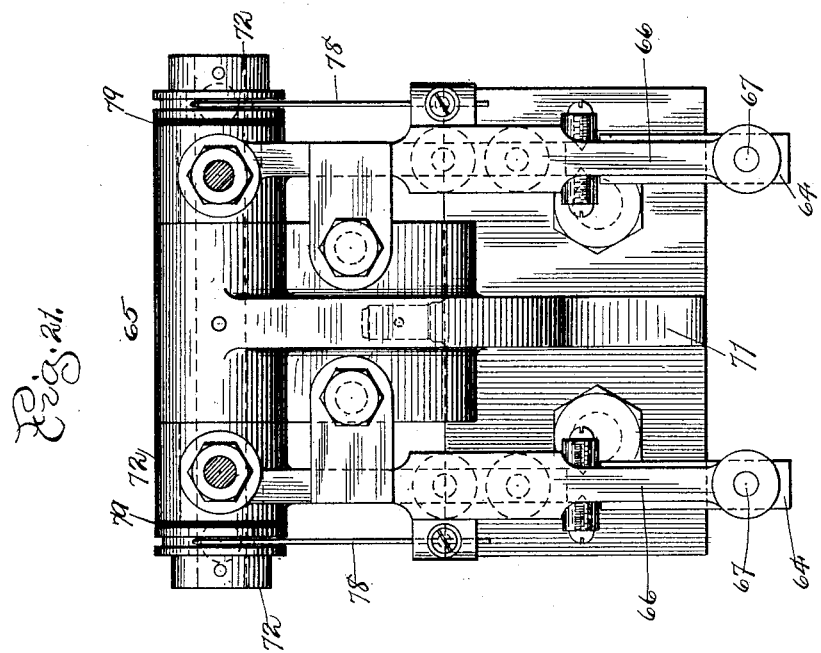
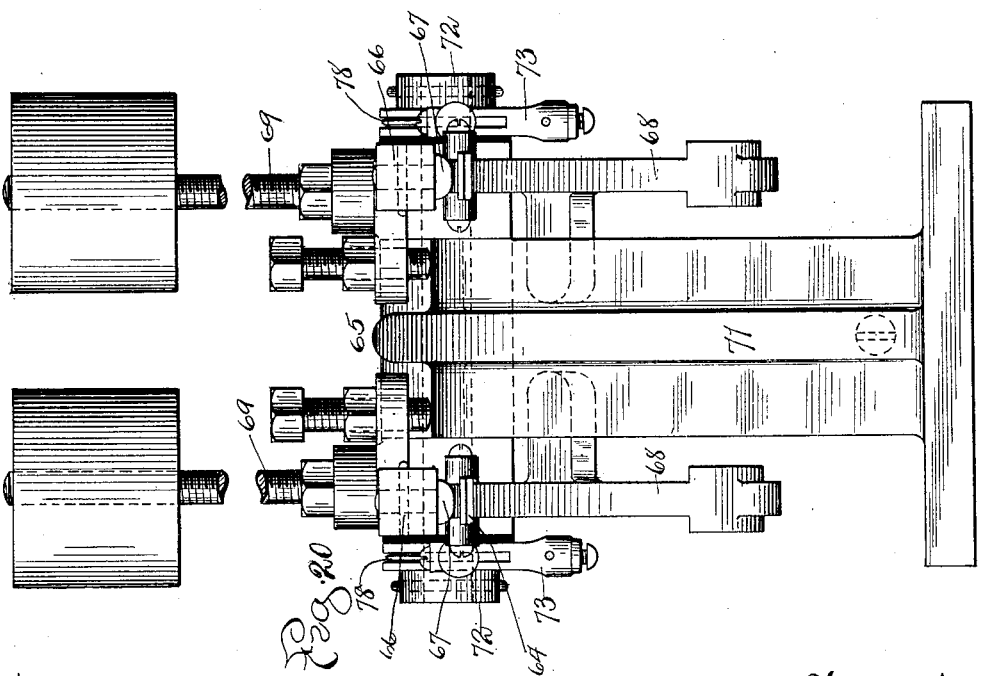

UNITED STATES PATENT OFFICE.

WILLIAM F. BRAUN, OF CHICAGO, ILLINOIS, ASSIGNOR TO JOHN E. SEARLES, OF NEW YORK, N. Y.

AUTOMATIC WEIGHING-MACHINE.

SPECIFICATION forming part of Letters Patent No. 640,625, dated January 2, 1900.

Application filed January 12, 1899. Serial No. 701,972. (No model.)

*To all whom it may concern:*

Be it known that I, WILLIAM F. BRAUN, a citizen of the United States of America, and a resident of Chicago, Cook county, Illinois, have invented a certain new and useful Automatic Weighing-Machine, of which the following is a specification.

My invention relates to certain improvements in what are known as "automatic weighing-machines," by which materials or commodities capable of movement in the form of a continuous stream are continuously and alternately weighed and separated in predetermined quantities and then discharged into the several receptacles for each individual quantity. In this class of machines a pivoted scale-beam is employed, having a receptacle at one end to receive the material and a weight at the other end. The material, in the form of a stream, is fed or permitted to feed into the receiver by means of a valve or cut-off gate. The valve or cut-off gate is usually termed a "stream-controller," and the receiver for the material to be weighed is usually termed a "load-receiver." The scale-beam, with its load-receiver at one end and the counterbalance-weight at the other, operates, as in the case of an ordinary weighing-scale, to weigh a predetermined quantity of material. When the predetermined given quantity of material is delivered into the load-receiver, it is evident that then the cut-off valve or gate must be closed and the supply of the material withheld momentarily until the weighed quantity of material in the load-receiver is discharged and the load-receiver returned into a position to receive another given predetermined quantity of material. The cut-off valve or gate must then be opened automatically to permit the material to feed into the load-receiver. In machines of this character it is essential, in order to weigh and deliver each separate quantity of material with accuracy, that the scale-beam shall be perfectly free and untrammeled in movement when weighing the material.

One of the principle features of my invention is to provide means whereby the scale-beam shall not be called upon to perform any work or initiate the performance of any work while weighing the material, leaving it free to accurately weigh said material.

My invention has certain other objects in view, which will be particularly described and pointed out hereinafter; and it consists in certain features of combination, arrangement of parts, and construction, which will also be particularly described, and generally and specifically pointed out in my claims, reference being now had to the accompanying drawings, in which—

Figure 1 is a front elevation of the complete machine. Fig. 2 is a central vertical section through the complete machine. Fig. 3 is a plan view of the machine on the line $a\,a$ of Fig. 1. Fig. 4 is a like view on the line $b\,b$ of Fig. 1. Fig. 5 is a side elevation of the machine. Fig. 6 is a vertical section through the hopper and delivery-spouts, showing the cut-off or stream-controlling valves or gates. Figs. 7 and 8 are each front views of the stream-controlling valves or gates, with the upper portion of the delivery-spouts and hopper in cross-section, said views illustrating the several positions assumed by the different valves or gates. Fig. 9 is a detail view of the cam mechanism, the scale-beam, and the stream-supply-controlling valves shown in the position assumed when the scale-beam is in a state of poise. Fig. 10 is an enlarged detail view of the scale-beam and the load-receiver, the latter in section. Fig. 11 is a detail plan view of the conical load-receiver bottom. Fig. 12 is a view similar to Fig. 10 except that the scale-beam frame is in section and the load-receiver shown in discharging position. Fig. 13 is a plan view of the weighing-beam frame. Fig. 14 is a detail enlarged view of the swinging circuit-closer and a diagrammatic view of the circuit including the battery. Fig. 15 is a detail view of the electrically-operated tripping mechanism and the electromagnets for operating the same and also showing the supplemental circuit-breaker. Fig. 16 is a plan view on the line $d\,d$ of Fig. 15. Fig. 17 is a plan view of the tripping device and supplemental circuit-breaker. Fig. 18 is a section on the line $f\,f$ of Fig. 15. Fig. 19 is a section on the line $h\,h$ of Fig. 15. Fig. 20 is a rear view of the swinging circuit-closer. Fig. 21 is a plan view of the same.

A main shaft 12 near the base of the machine is driven by a pulley 13, belted to the line-shafting in the usual way. Cam-shafts 14 and 15 extend at right angles to the drive-shaft 12, and worm-gears 16 and 17 on the drive-shaft, meshing with the worm-wheels 18 and 19, mounted on the cam-shafts 14 and 15, serve to rotate said cam-shafts.

A rotatable package-carrier table 20, horizontally supported by the vertical shaft 21, is intermittently rotated by means of the worm-gears 22, respectively on the drive-shaft 12 and the table-actuating shaft 23. Secured near the upper end of the table-actuator shaft 23 is a pinion drive-wheel 24, carrying the segment of gear 25, Fig. 4, adapted to intermittently engage the segments of gear 26 on the table-rotating wheel 27, secured on the vertical shaft 21.

The package-carrier table 20 has secured thereon the receivers 28, arranged in a circle, and the paper bags to receive the weighed material are placed in these receivers and held in a position to receive and be filled with the weighed material. The circular line of receivers are arranged to bring the bags one by one below the delivery-orifice of the discharge-hopper 29, and an attendant at the machine removes the filled packages and adjusts the unfilled paper bags within the receiver. The worm-gear connections and the intermittent segmental-gear sections are so arranged and timed in their operation to rotate the table that the bags are brought one by one beneath the discharge-orifice of the discharge-hopper 29 and receive the weighed loads of material as and when they are discharged by the automatic weighing mechanism to be described.

The material is deposited within the receiving-hopper 30, Fig. 6, from which depends, as shown, the four stream-delivery chutes 31.

The delivery-orifices of the lower end of the stream-chutes 31 are controlled or gradually closed by means of cut-off valves or gates 32. These cut-off gates are actuated to open and close by means to be described.

As the mechanism by which the material is weighed, the cut-off valves controlled, and the material discharged from the load-receiver is the same in all of the plural sets, it will suffice to describe the arrangement and operation of one set.

A scale-beam 33 or scale-beam frame is mounted pivotally at 34 upon the pedestal-support 35, secured to the top plate 36. The scale-beam frame 33 comprises the arms 37, Fig. 13, and the rearwardly-extended weight-arms 38, carrying the counterbalance-weights 39. The scale-beam also carries a contact-maker 40, the purpose of which will be hereinafter described. The load-receiver 41 is mounted to pivotally swing on the arms 37 of the scale-beam 33. It is obvious, therefore, that the load-receiver, the scale-beam, and the weights operate in the same manner as an ordinary scale to weigh material delivered into the load-receiver, as more particularly shown in Figs. 10 and 12.

It is necessary, in order that the machine may operate automatically, that means should be provided to automatically control the stream of material, cut it off when the predetermined quantity is deposited in the load-receiver and weighed, and also act upon the scale-beam to advance the load-receiver from a poised position into a position of discharge. To accomplish these ends, I provide the positively-acting cam mechanism in coöperative arrangement with electrically-operated devices, which I shall now describe.

In the machine, as shown, are four sets of devices which receive, respectively, the stream of material and weigh and discharge the same. The cam-shaft 14 on one side of the machine serves to operate one pair of sets, and the cam-shaft 16 on the other side of the machine the other pair of sets. I shall, however, describe the construction, arrangement, and operation of parts by which one set of automatic weighing mechanism is controlled.

A discharge-cam 42 is secured upon the cam-shaft 14 and operates to reciprocate a discharge-rod 43, having at its upper end an engaging finger 44, adapted to strike the scale-beam at a point near the counterbalance-weights 39. The function of this cam 42 and rod 43 is to positively and directly engage the scale-beam when poised and force the load-receiver, with the weighed contents thereof, into a discharging position.

To control the opening and closing movements of the cut-off gates 32, I provide a stream-controller cam 45, eccentrically mounted on the shaft 14, and a stream-controller rod 46, reciprocated by said cam 45. The upper end of the rod 46 carries an antifriction-finger 47, adapted to engage the arm 48 of the valve-controlling frame 49, pivoted at 50. A weighted arm 51, secured to the valve-controlling frame 49, normally tends to close the valve 32. The cut-off valve controlling the stream of material is opened to permit a feed by means of the stream-controller rod 46, which overcomes the resistance of the weighted arm 51 and engaging the rod 48 of the cut-off-valve frame 49 lifts the cut-off valve 32 into the open position. The cut-off valve is gradually closed or permitted to close by the vertical movement of the rod 46. This gradual closure of the cut-off valve is controlled positively by the cam 45 and the rod 46 until the valve is nearly closed and a small stream of material is discharging into the load-receiver, when the valve is seized and momentarily held in this position by means of a tripping device, which I shall now describe.

Supported upon a standard 52 is a magnet-box 53, inclosing the electromagnets 53$^a$. An armature 54 operates an armature-rod 55, connected to the tripping-lever 56, which latter is pivoted at 57. The upper end of the tripping-lever 56 carries a notched engaging head 58, having an inclined face 59. The extreme end of the tripping-rod 60, extended from the cut-off-valve frame 49, is adapted to slidably bear against the inclined face 59 of the engaging head 58 and also engage in the notch 61 thereof. An arm 62, secured to and projected forward from the tripping-lever 56, carries an adjustable antifriction member 63, which is engaged by the tripping-rod 60 when it is pulled downward by the rod 46, and thus the head 58 of the tripping-lever 56 is drawn forward into a position to engage with said tripping-rod 60, as described, and the armature 54 also drawn away from the electromagnets 53ª.

I shall now proceed to describe the circuit arrangement and means for energizing and discharging the electromagnets 53ª, which latter include a tilting circuit-closer operated by the scale-beam 33 and a supplemental circuit-breaker in the magnet-box 53.

As previously described, the scale-beam 33 carries a contact-maker 40, which is adapted to engage the contact-strip 64, Fig. 14, carried by the tilting circuit-closer, (designated as a whole at 65.) This circuit-closer comprises a contact-bearing conducting-arm 66, carrying the contact 67, between which and the contact-strip 64 the circuit is adapted to be closed to the electromagnets 53ª. The circuit-closer 65 also comprises a returning-finger 68, formed with the conducting-arm 66 and a weighted rod 69, and it is pivotally mounted to swing or tilt upon the shaft 70, supported upon the standard 71. The sleeve 72 of the circuit-closer, about the shaft 70, carries a binding-post 73, to which one of the leads, 74, to the electromagnet 53ª is attached, the other lead, 75, of said electromagnets being connected to a binding-post 76, secured to the standard 71, said lead including the battery or other suitable source of current-supply, (indicated at 77.) A contact-strip 78, also carried by the conducting-arm 66, bears on the sleeve 72. The circuit may be traced, when the contacts 64 and 67 are closed, through the said contact-strip 64 to the contact-strip 78, the intermediate metal portions being suitably insulated from the conducting-arm 66, thence through the contact-strip 78 to the sleeve 72, through the sleeve and binding-post 73 to the lead 74, through the lead 74 to and through the electromagnets 53ª to the lead 75, battery 77, and binding-post 76, thence through the standard 71 to the part of the sleeve 72 carrying the conducting-arm 66, the insulation 79 serving to isolate the conducting-arm 66 from that part of the sleeve 72 carrying the binding-post 73, from thence over the conducting-arm 66 to the contact 67.

It is evident that the weighted end of the scale-beam 33, carrying the contact-maker 40, is adapted to close the circuit of the electromagnets 53ª, which when energized operate the tripping-lever, thereby releasing the cut-off-valve frame and permitting the valve to be closed by the weighted arm 51 and the stream of material entirely cut off.

I provide a supplemental or auxiliary circuit-breaking device at the magnet-box, which momentarily opens the circuit and discharges the electromagnet. This device comprises a contact-carrying rod 85, which carries the carbon contacts 86, a spring 87 serving as a take-up for said carbon contacts. A spring 88 normally tends to open the contact, and a locking device is employed to normally overcome the spring and keep the contacts together. This locking device comprises a bell-crank lever 89, pivoted at 90, with one of its arms notched at 91 to engage the head 92 on the carbon-rod 85, and a stud 93 in the plane of the lower end of the tripping-lever 56. I shall give a more particular description of the operation of this supplemental circuit-breaker in connection with the general description of the operation of the machine as a whole.

I shall now proceed to describe generally the operation of my improved machine, having given a description of its construction.

Assume the cut-off valve or gate 32 to be open to the widest extent and the load-receiver 41 empty and in its highest position, with the counterbalance-weights in their lowest position. The material now descends in a stream through the chute 31 into the load-receiver 41. As this takes place the cam 45 raises the rod 46 and permits the outer end of the valve-controlling frame 49 to move upward, the weighted arm gradually closing the cut-off valve 32. This closure of the cut-off valve is gradual, because the rod 46 maintains a hold upon the valve-frame 49 and, gradually rising, permits the valve to gradually close. As this takes place the end of the tripping-rod 60 engages the bevel face 59 of the tripping-lever 56 and moves the same, together with the connected armature 54, toward the electromagnets 53ª until the tripping-rod engages in the notch 61 on the tripping-lever 56, Fig. 15. As previously stated, during this part of the operation the valve is gradually closed and the feed of the material gradually cut off. The rod 46 continues to move upward and releases its restraining hold upon the cut-off-valve frame, which is now held by the tripping-lever, and the cut-off valve is very nearly closed, permitting a very small quantity of material to feed into the load-receiver. As the material accumulates in the load-receiver it descends toward a discharging position and the weight end of the scale-beam ascends until the predetermined quantity has fed into the load-receiver, when the scale-beam balances or poises and weighs the material. The contact-maker 40 on the weight end of the scale-beam is now bearing lightly or just touching the contact-strip 64 on the tilting circuit-closer 65, with the scale-beam horizontal and in equilibrium. As the cut-off valve is very nearly closed a minute quantity of material is fed into the load-receiver and the weight end of the scale-beam is slightly tilted upward, lifting the contact-strip 64 against the contact 67 and closing the electromagnet-circuit. The electromagnets 53ª are now energized, the armature 54 attracted, the tripping-lever 56 moved, and the cut-off-valve frame 49 released, when the weighted arm 51 immediately closes the cut-off valve 32. The tripping movement of the tripping-lever 56 causes its lower end to engage the bell-crank lever 89 and release the carbon rod 85, when the spring 88 separates the carbons 86, thus breaking the circuit and discharging the electromagnets 53ª. The load-receiver 41, with its weighed load, is now brought positively into a discharging position by means of the cam 42 and cam-rod 43, the finger 44 of which latter engages the scale-beam frame at the weighted end thereof and raises said end upward, forcing the load-receiver 41 downward. The load-receiver has a cone-shaped bottom 100 and an annular opening 101, normally closed by the annular band 102, having the engaging flange 103. As the load-receiver is forced downward this flange 103 engages the top plate 36 and causes the band 102 to assume a stationary position. The load-receiver slides within said band, uncovering the opening 101 and discharging the material into the stream-directing receiver 29. The material so weighed and delivered passes through said receiver and is delivered into the bag directly below the discharge-orifice of said receiver. The carrier-table 20 is then rotated to bring another bag in line with said discharge-orifice of the directing-receiver. As the weighted end of the scale-beam ascends in discharging the load-receiver it tilts or swings the circuit-closer 65 back out of the way and then continues to ascend until the load-receiver assumes its discharging position. When the load-receiver is brought into a discharging position, the rod 43 releases the scale-beam and descends, and when the load-receiver is discharged the weights on the scale-beam raise the load-receiver into highest receptive position. The cut-off valve 32 is now open to its greatest extent by means of the cam-rod 46 and cam 45, which pull down upon the cut-off-valve frame 49, the tripping-rod 60 engaging the restoring-arm 62 and bringing the tripping-lever 56 into a position to engage said tripping-rod. The spring-fingers 104 bear against the cut-off valve 32 and serve to hold said valve closely upon its seat.

From the foregoing description it will be observed that the scale-beam is disengaged and permitted to perform its work of accurately weighing the material in the same manner as in the ordinary scale. The scale-beam is not called upon to perform any work until after the material is weighed. An exceedingly minute quantity of the material delivered by the small feed after the material is weighed causes the electromagnet-circuit to be closed by the scale-beam. The circuit is immediately opened by the supplemental contacts at the magnet-box. The load-receiver is brought by positively-acting mechanism into a position of discharge, and the cut-off valve is positively opened to its fullest extent also by positively-acting mechanism unconnected with the scale-beam. The cut-off valve is gradually permitted to close by positively-acting mechanism, which maintains a hold upon said valve and controls its movement of closure until the valve is held open in a position to deliver a small feed by means of the electrically-operated engaging and tripping mechanism.

Having thus described my invention, what I claim as new therein, and desire to secure by Letters Patent, is—

1. In a weighing-machine, a pivoted scale-beam, a load-receiver carried thereby, positively-acting discharging mechanism which forces the scale-beam and load-receiver into a discharging position, a stream-controlling valve and positively-acting mechanism for controlling the closure of said valve and for opening the same, whereby the scale-beam is disengaged and free while weighing.

2. In a weighing-machine, a plurality of scale-beams, load-receivers carried by each of said scale-beams, stream-supplying means to each load-receiver, positively-acting mechanism for alternately forcing each scale-beam and load-receiver into a discharging position and positively-acting mechanism for controlling the closure of a cut-off valve and for opening the same, whereby each scale-beam is disengaged and free while weighing and in turn receives and discharges its load, together with a delivery-chute for the discharged load, an intermittently-rotated carrier-table and means for rotating said table.

3. In a weighing-machine, a scale-beam and load-receiver carried thereby, a cut-off valve or gate, positively-acting mechanism for controlling and determining the opening and closing movements of said valve, an engaging device electrically operated to coöperate with the positively-acting mechanism aforesaid and hold the valve slightly open to permit a small feed of the material, positively-acting mechanism for moving the scale-beam into a discharging position and a circuit-closer operated by the scale-beam after the load is completed.

4. In a weighing-machine, a scale-beam and load-receiver carried thereby, a cut-off valve or gate, positively-acting mechanism which engages the scale-beam and forces it into a discharging position, positively-acting mechanism which gradually closes, or permits a closure, of the cut-off valve until it assumes a nearly-closed position, an engaging device which holds the valve in this position momentarily until the load is completed, electromagnets operating to disengage the engaging device, and close the valve, an electric circuit for said magnets including a source of current-supply, and a circuit-closer operated by the scale-beam when the load is weighed.

5. In a weighing-machine, a scale-beam and load-receiver carried thereby, a cut-off valve or gate, positively-acting mechanism which engages the scale-beam and forces it into a discharging position, positively-acting mechanism which gradually closes, or permits a closure, of the cut-off valve until it assumes a nearly-closed position, an engaging device which holds the valve in this position momentarily, electromagnets operating to disengage the engaging device, and close the valve, an electric circuit for said magnets including a source of current-supply, and a pivoted swinging circuit-closer located in the plane of the ascending end of the scale-beam, operated to close the electromagnet-circuit by the scale-beam, after the load is weighed, and then thrown aside by the positive upward movement of the said end of the scale-beam.

6. In a weighing-machine, the combination with a pivoted scale-beam and load-receiver carried thereby of engaging devices for holding the cut-off valve slightly open to permit a small feed of the material, electromagnets for disengaging said engaging devices, a source of current-supply, and a swinging circuit-closer pivotally located in the plane of advance of the scale-beam, together with means for forcing the load-receiver into a discharging position and at the same time operate to swing the circuit-closer aside.

7. In a weighing-machine, a pivoted scale-beam, a load-receiver carried thereby, a cut-off valve or gate and cam mechanism and connections for forcing the scale-beam and load-receiver into a discharging position and controlling and determining the opening and closing movements of the said cut-off valve or gate.

8. In a weighing-machine, a pivoted scale-beam, a load-receiver carried thereby, a cut-off valve or gate and cam mechanism and connections arranged in sets, one set to force the scale-beam and load-receiver into a discharging position and the other controlling and determining the opening and closing movements of the valve.

9. In a weighing-machine, a pivoted scale-beam, a load-receiver carried thereby, cam mechanism and connections engaging said scale-beam, after the load is completed, to force the load-receiver into a discharging position, cam mechanism and connections for opening the cut-off valve or gate and gradually permit a closure thereof, an engaging device for holding the cut-off valve in a nearly-closed position and means for withdrawing said engaging device the operation of which is by the scale-beam.

10. In a weighing-machine, the combination with the scale-beam and load-receiver carried thereby, of a swinging circuit-closer located in the plane of advance of the scale-beam, an engaging device holding the cut-off valve or gate slightly open, an electric circuit including electromagnets and a source of current-supply, the scale-beam engaging the circuit-closer to close the electromagnet-circuit and move the said swinging circuit-closer to one side and means whereby the scale-beam returns the swinging circuit-closer into its former position.

11. In a weighing-machine, a scale-beam and load-receiver carried thereby, a pivoted and swinging circuit-closer in the plane of advance of the scale-beam, comprising a contact-carrying member engaged by the scale-beam to move the circuit-closer aside and an extension engaged by the scale-beam to return the circuit-closer into its former position.

12. In a weighing-machine, a scale-beam and load-receiver carried thereby, a swinging circuit-closer located in the plane of advance of the scale-beam, a circuit including electromagnets and a source of current-supply, a pivoted tripping-lever, an armature operated by said electromagnets to in turn operate the tripping-lever and cut-off-valve connections engaged by the tripping-lever.

13. In a weighing-machine, a scale-beam and load-receiver carried thereby, a swinging circuit-closer located in the plane of advance of the scale-beam, a circuit including electromagnets and a source of current-supply, a pivoted tripping-lever, an armature operated by said electromagnets to in turn operate the tripping-lever and cut-off-valve connections engaged by the tripping-lever, together with a circuit-breaker operated by the tripping-lever.

14. In a weighing-machine, a scale-beam and load-receiver carried thereby, a swinging circuit-closer located in the plane of advance of the scale-beam, positively-acting mechanism for engaging the scale-beam and forcing it into a discharging position, an electric circuit including electromagnets and a source of current-supply, a tripping device holding the cut-off valve in a slightly-open position and positively-acting mechanism which controls and determines the movements of the cut-off valve when not engaged by the engaging device aforesaid.

15. In a weighing-machine, the combination with a cut-off valve or gate and connections therefor, of a tripping device engaging said connections to hold the valve in a slightly-open position, positively-acting mechanism engaging said connections to control and determine the movements of said valve when not held by the tripping device, electromagnets, a source of current-supply for operating the tripping device and an extension from the tripping device engaged by the positively-acting mechanism to restore said tripping device when operated by the electromagnets aforesaid.

Signed by me at Chicago, Cook county, Illinois, this 7th day of January, 1899.

WILLIAM F. BRAUN.

Witnesses:
CHARLES C. BULKLEY,
L. M. BULKLEY.